United States Patent [19]

Muller

[11] 4,119,540

[45] Oct. 10, 1978

[54] COUNTER-CURRENT AUTOMATIC CLEANING FILTER

[75] Inventor: Jean-Claude Muller, Neuilly-sur-Seine, France

[73] Assignee: Rellumit-Inter, Courbevoie, France

[21] Appl. No.: 859,182

[22] Filed: Dec. 9, 1977

[30] Foreign Application Priority Data

Dec. 22, 1976 [FR] France .................. 76 38662

[51] Int. Cl.² ........................................... B01D 29/38
[52] U.S. Cl. ................................ 210/142; 210/333 A
[58] Field of Search .................. 210/333.1, 330, 340, 210/345, 142, 148

[56] References Cited

U.S. PATENT DOCUMENTS

| | | | |
|---|---|---|---|
| 3,380,591 | 4/1968 | Muller | 210/333.1 |
| 3,780,868 | 12/1973 | Miles | 210/333.1 |

FOREIGN PATENT DOCUMENTS

| | | | |
|---|---|---|---|
| 2,021,918 | 11/1971 | Fed. Rep. of Germany | 210/333.1 |
| 1,761,827 | 2/1972 | Fed. Rep. of Germany | 210/142 |

*Primary Examiner*—John Adee
*Attorney, Agent, or Firm*—Irons and Sears

[57] ABSTRACT

The filter has a filtering chamber in which a number of hollow filtering elements are arranged on a circle about the axis of the filter. The chamber has a liquid inlet and a liquid outlet and the hollow filtering elements communicate in parallel with the inlet and outlet. A hollow arm defining a passageway is rotatable about the axis of the filter and the passageway is capable of putting all the inlets of the filtering elements successively in communication with an impurities discharging chamber in which prevails a pressure lower than the pressure of the filtered liquid. The arm is connected to rotate with the driven member of a unidirectional step-by-step drive mechanism. The arm is also connected to rotate with the driven member of a second unidirectional step-by-step drive mechanism in the same direction as with the first drive mechanism.

4 Claims, 6 Drawing Figures

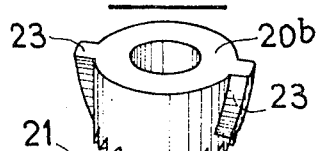
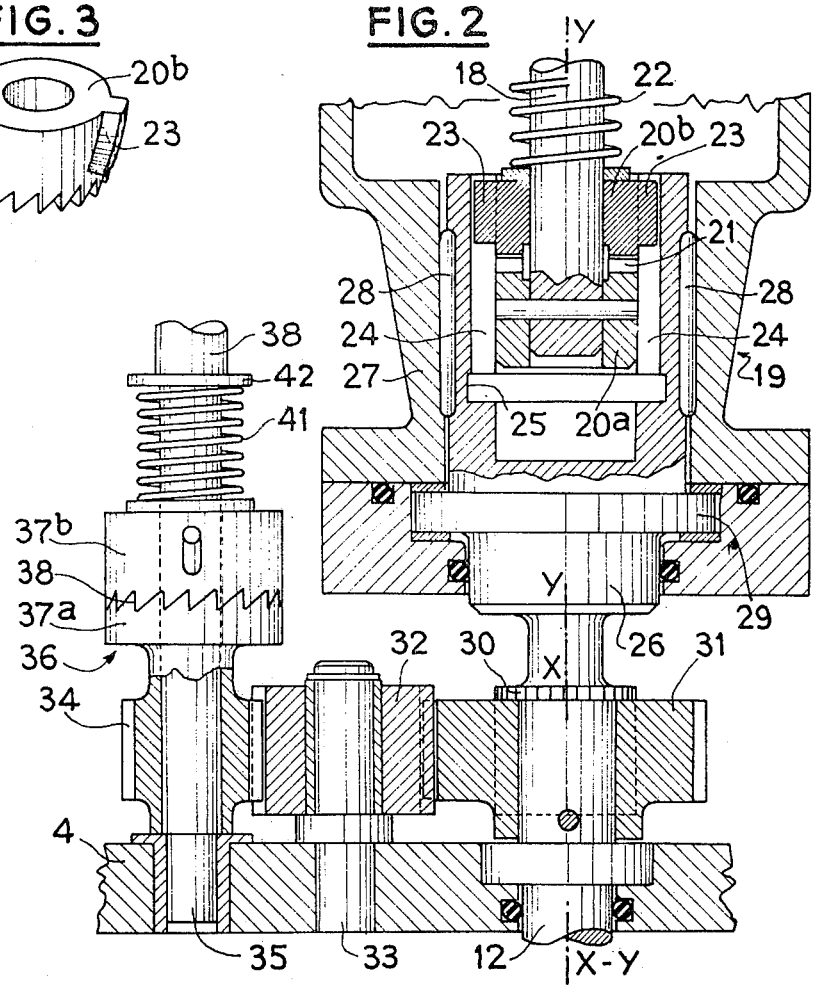
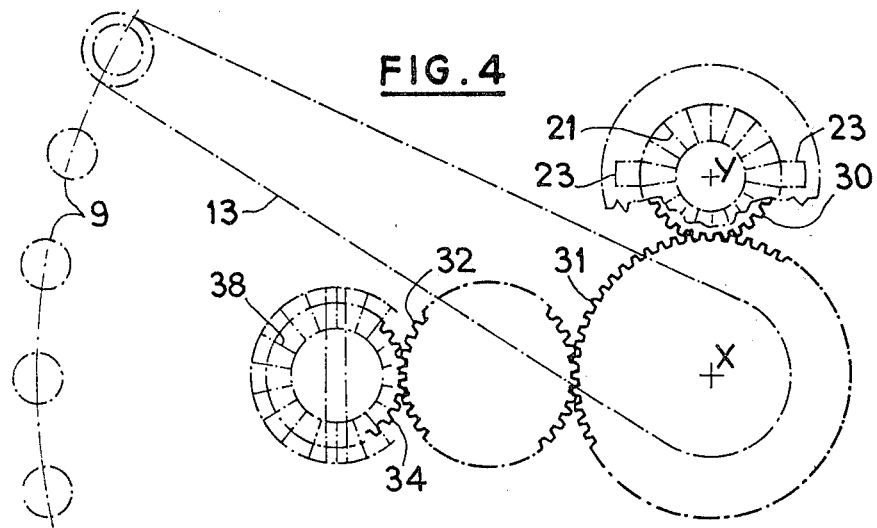

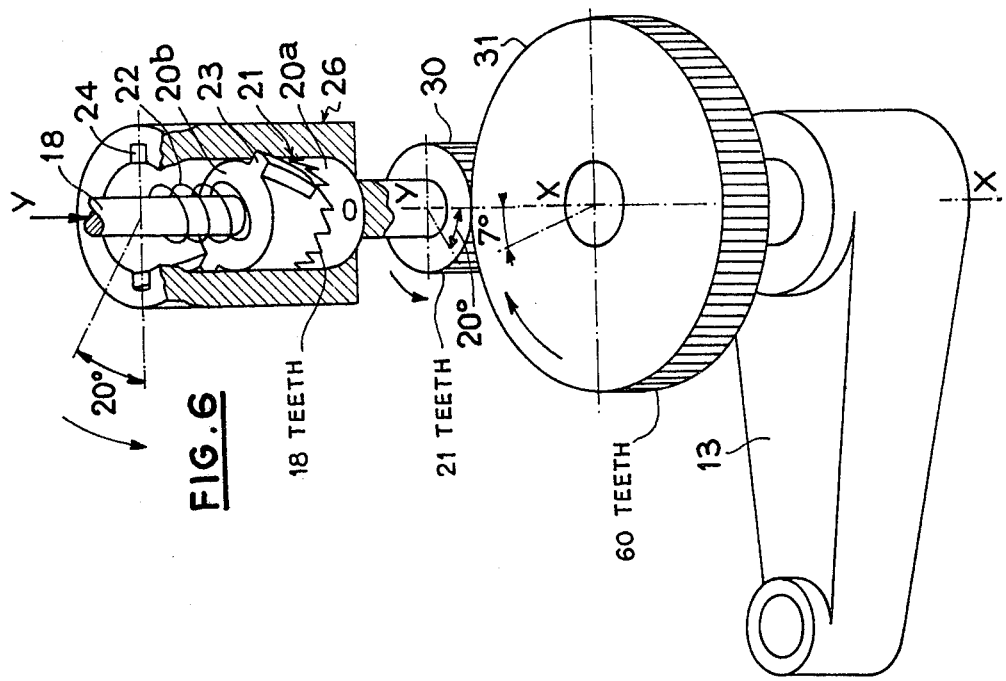
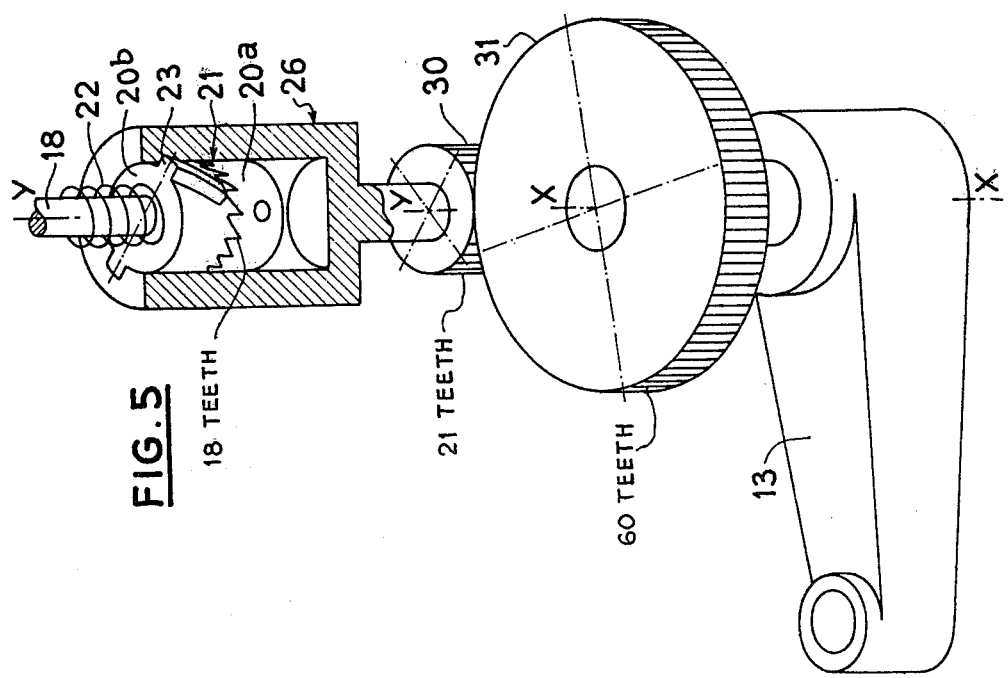

COUNTER-CURRENT AUTOMATIC CLEANING FILTER

The present invention relates to devices for purifying or cleaning liquids such as hydrocarbons and more particularly concerns a counter-current purifying filter comprising a number of filtering elements which may be automatically cleaned by temporarily reversing the flow in each filtering element in accordance with a given sequence.

Filters of this type have been disclosed in German Patent Publications N° DAS 1,761,827 and DOS 2,021,918 and in particular in French Patent N° 1,437,838, U.S. Pat. No. 3,380,591. In this latter prior publication, the filtering elements are constructed in the form of vertically disposed columns arranged on a circle around the axis of the filter. Each element is put successively in communication with a rotary arm forming a pipe which permits reversing the current of the liquid in the element concerned for unclogging this element, a complete rotation of the arm having for effect to clean the whole of the filter.

The arm is rotated by a motor which advances the arm in a step-by-step manner so as to put it successively in coincidence with each filtering element, this motor being supplied with the liquid to be cleaned.

In another filter of this known type, according to the First Addition to the aforementioned French Patent, filed on the June 11 1965 under the P.V. 138,630, the step-by-step rotary arm advancing mechanism is disposed outside the filter and comprises an electromagnet which actuates at regular intervals a pawl which cooperates with a ratchet wheel connected to rotate with the shaft of the arm.

In these two types of filter, the unclogging obviously ceases when the step-by-step drive mechanism breaks down, which does not however prevent the filter from operating normally until these filtering elements have been obturated by impurities extracted from the liquid to be cleaned.

But when the filtering elements are finally clogged up, the filter becomes useless and must therefore be disconnected from the circuit in which it is mounted.

An object of the invention is to provide an automatic counter-current cleaning filter wherein the unclogging may be carried out even when the motor driving the rotary arm breaks down or is blocked.

According to the invention, there is provided an automatic counter-current cleaning filter comprising a number of filtering elements arranged on a circle defining an axis of the filter in a filtering chamber provided with a liquid inlet and outlet to which the elements are connected in parallel, and a hollow arm constituting a pipe and mounted to rotate about said axis and capable of successively connecting all the inlets of said elements to an impurity discharging chamber in which prevails a pressure lower than the pressure of the filtered liquid, said arm being connected to be rotated by the driven element of the unidirectional step-by-step drive mechanism, wherein said arm is also connected to rotate with the driven element of a second unidirectional step-by-step drive mechanism in the same direction as the first step-by-step drive mechanism.

Owing to these features, the unidirectional step-by-step drive mechanisms may replace each other mutually even if one is blocked for some reason, so that the unclogging of the filter can always be ensured.

According to another feature of the invention, the second step-by-step drive mechanism is controlled manually. Thus, it becomes possible, by putting out of action the first mechanism, to modulate the declogging time of a particular element among the filtering elements, by stopping the arm for a longer period of time on this element than would normally be necessary in the course of the automatic procedure, for example if it is known that the amount of impurities retained by this element is particularly large.

In the filters of the prior art mentioned hereinbefore, the automatic unclogging device is designed for each dimension of the filter or, in other words, for the number of filtering elements disposed about the axis of the filter. This is due to the fact that the step or pitch of the step-by-step movement of rotation of the arm varies in accordance with the angular spacing between the filtering elements.

Consequently, there must be provided for a given range of filters as many unclogging devices as there are filters in this range.

According to another feature of the invention concerned more particularly with the avoidance of this drawback, the angular step or pitch of progression of the rotary arm for an angular spacing between the filtering elements equivalent to a whole number of degrees is equal to a number which is prime to 360°.

Preferably, the value of this angular step corresponds to 7° at which value the rotary arm is in exact coincidence with the inlet of each filtering element once in the course of a cycle of 7 rotations of the rotary arm. Consequently, there is very satisfactory unclogging of all the filtering elements of a filter irrespective of the number of elements and the spacing therebetween.

Further features of the invention will be apparent from the ensuing description with reference to the accompanying drawings which are given solely by way of example and in which:

FIG. 2 is a sectional view, to an enlarged scale, of a first and a second unidirectional step-by-step drive mechanism for the rotary shaft of the filter shown in FIG. 1;

FIG. 3 is a perspective view of a wheel employed in the mechanism shown in FIG. 2;

FIG. 4 is a diagrammatic view of the gears employed in the filter according to the invention, and FIGS. 5 and 6 are diagrammatic perspective views showing how the step of progression through 7° of the rotary arm of the filter is achieved.

Figure 1:
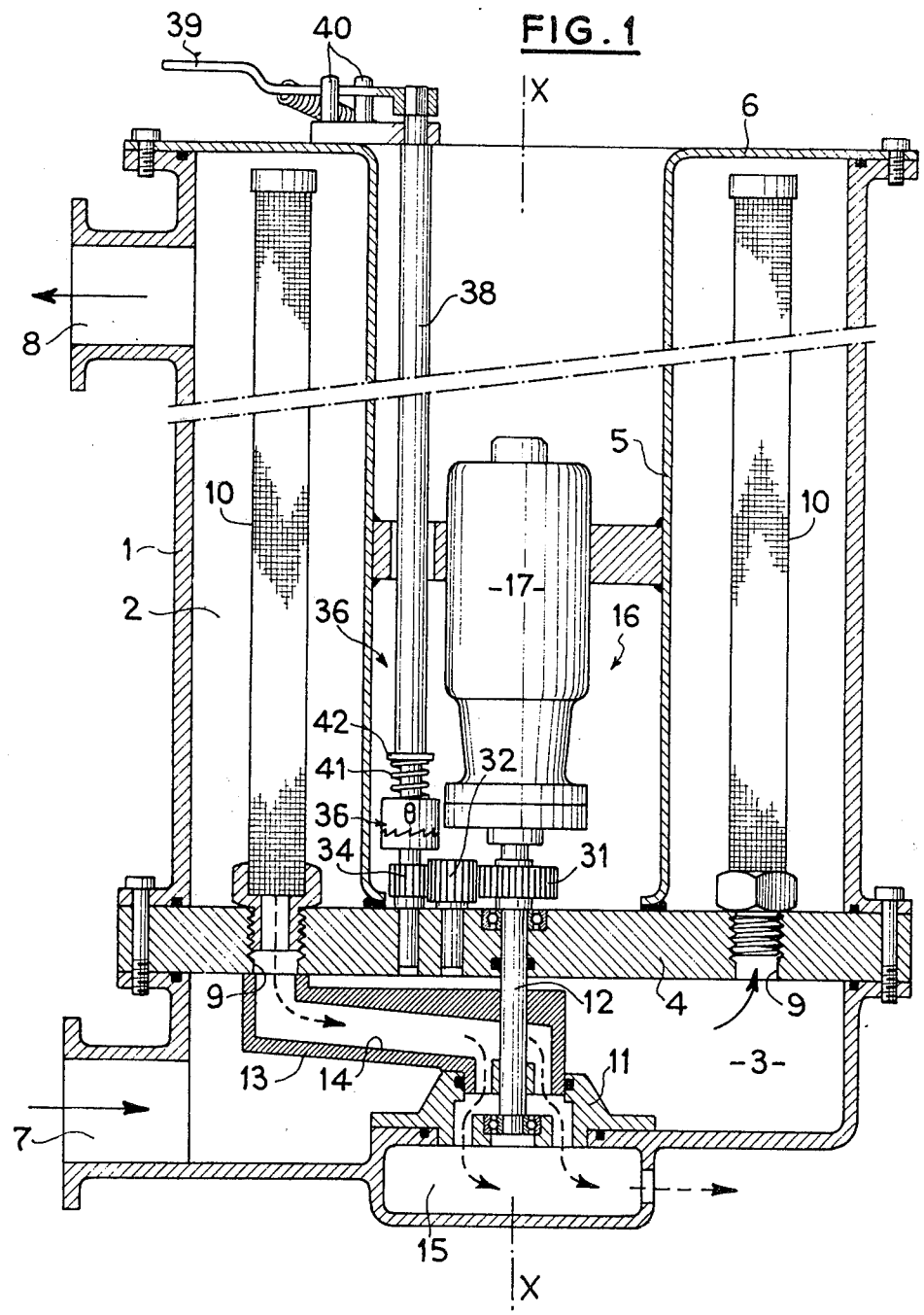
FIG. 1 is an axial sectional view of a filter according to the invention.

In the embodiment shown in FIGS. 1 to 4, the filter according to the invention comprises a filter housing 1 of cylindrical shape divided into two compartments 2 and 3 by a radial partition wall 4, the upper compartment 2 being defined by an inner cylindrical wall 5 which imparts thereto an annular shape. This inner wall 5 has a radial flange 6 bolted to the housing 1.

The latter has an inlet aperture 7 for the liquid to be filtered and an outlet aperture 8 for the filtered liquid. The intermediate partition wall 4 is provided with a series of screwthreaded openings 9 arranged on a circle around the axis X—X of the filter. Screwed in these openings, which constitute inlets, are the bases of as many filtering elements 10 which are in the form of columns extending vertically upwardly from the partition wall 4. It will be understood that the filtering elements may be fixed in some other way in the filter. For example, in a modification (not shown) they may be each fitted into a cylindrical bore and made to bear against a flat joint element by a spring exerting a pressure on the opposite end of the corresponding filtering element.

The compartments 2 and 3 communicate with each other by way of the openings 9 and the filtering elements. Note that the filtering elements may be constructed in any suitable way, their shape having no effect on the performance of the filter of the invention, provided they can each be connected to an opening 9 of the partition wall 4.

Disposed at the centre of the bottom of the housing 1, is a support plate 11 which constitutes a bearing for a driving shaft 12 having an axis X—X and on which a rotary arm 13 is keyed. A passageway 14 which has substantially the shape of a Z turned through 90° is formed in the arm 13. This passageway communicates by way of the support plate 11 with a decanting chamber 15 connected to a discharge (not shown) which is at atmospheric pressure.

The passageway 14 may communicate selectively with each of the inlet openings 9 of the wall 4 in the course of the rotation of the arm 13. This rotation is brought about by a drive device which is shown in more detail in FIGS. 2 and 3. This drive device 16 is disposed in the central cylindrical space defined by the annular compartment 2 and is therefore accessible with no need to open the part of the filter in which the fluid flows. Moreover, this drive device is so designed that it is universal for a whole range of filters of this type irrespective of the size, the number of filtering elements and the angular spacing therebetween.

In the illustrated embodiment, the power supply is a hydraulic motor 17 whose output shaft 18 is subjected to a continuous to-and-fro movement along the axis thereof. The shaft 18 constitutes the input member of a first unidirectional step-by-step drive mechanism 19 which comprises a first ratchet wheel $20^a$ which is keyed on the shaft 18 and coaxial with the latter. A coil spring 22 causes the wheel $20^a$ to engage, through dissymmetrical teeth 21, a second ratchet wheel $20^b$ (FIG. 3) provided with two helical ramps 23 projecting from the peripheral surface thereof and in diametral relationship to each other.

The helical ribs or ramps 23 are engaged with complementary helical grooves 24 in the inner wall of a blind aperture 25 of a spindle 26 which is rotatably mounted in the partition wall 4 of the housing 1, its axis Y—Y being parallel to the axis X—X of the filter. The spindle 26 constitutes the driven member of the first step-by-step drive mechanism 19 and is maintained by an extension 27 of the hydraulic motor 17 through a needle rolling bearing 28 and a bearing surface 29 formed on the spindle.

A gear pinion 30 is keyed on the spindle 26 and engages a gear wheel 31 which is connected to the rotary arm 13 through the shaft 12 so as to rotate with this arm. The gear wheel 31 is engaged with an intermediate gear pinion 32 which is mounted on a pin 33 engaged in the partition wall 4. The pinion 32 is engaged with a gear pinion 34 of the driven member 35 of a second unidirectional step-by-step drive mechanism 36. This driven member 35 is in the form of a spindle on which there are machined the gear pinion 34 and a ratchet wheel $37^a$ which cooperates with a complementary ratchet wheel $37^b$ through sets of dissymmetrical teeth 38. The wheel $37^b$ is keyed on an actuating rod 38 which extends through the filter and out of the top of the latter and can receive an automatically-return lever 39 which moves between two stops 40 having a certain angular spacing therebetween (for example 20°) relative to the axis of the rod 38. The ratchet wheel $37^b$ is held in contact with the wheel $37^a$ by a coil spring 41 which bears against a shoulder 42 on the rod 38.

The angular step of advance of the arm 13 is so chosen that the same drive device 16 just described can be employed irrespective of the number of filtering elements 10 or the spacing therebetween. For an angular spacing between the filtering elements equal to a whole number of degrees, the angular step is chosen to be equal to the number which is prime to 360°, this number being preferably equal to 7°. Thus the drive device 16 is capable of placing the arm in all the angular positions corresponding to a whole number of degrees.

FIGS. 5 and 6 illustrate an embodiment in which the pair of ratchet wheels $20^a$ and $20^b$ effect a step of 20° for each to-and-fro movement of the shaft 18. Under these conditions, the set of teeth 21 comprises therefore eighteen teeth. If twenty-one teeth are chosen for the gear pinion 30 and sixty teeth for the gear wheel 31 (ratio 20/7), the arm 13 will move through a step of 7° for each movement of the shaft 18.

The following table can thus be drawn up:

| Rotation of the arm | Positions passed through | | | |
| --- | --- | --- | --- | --- |
| 1 | 0, | 7, | 14, | 21 ... |
| 2 | 4, | 11, | 18, | 25 ... |
| 3 | 1, | 8, | 15, | 22 ... |
| 4 | 5, | 12, | 19, | 26 ... |
| 5 | 2, | 9, | 16, | 23 ... |
| 6 | 6, | 13, | 20, | 27 ... |
| 7 | 3, | 10, | 17, | 24 ... |
| 8 | 0, | 7, | 14, | 21 ... |

Of course, it is possible to position the rotary arm with a precision of 1° by choosing for the step a value of for example 11° or 13°. However, the advantage of employing an angle of 7° resides in the fact that, in the course of a given rotation of the arm 13, a larger number of filtering elements is nearer to the position of complete coincidence with the inlets of the elements.

If the angular spacing between the axes of the filtering elements is different from a whole number of degrees, for example 0.5°, note that the linear spacing between these axes remains small, even if the radius of the circle on which the elements are arranged is already relatively large. For example, in respect of a radius of 250 mm, 1° corresponds to an arc whose chord is about 4.3 mm, 0.5° corresponding to a chord of 2.15 mm. Such a deviation from coincidence between the aperture of the arm 13 and the inlet of each filtering element is relatively small and will permit a satisfactory unclogging of the element since a large counter-current can be nevertheless created. Also, even if the angular spacing between the filtering elements corresponds to an angle whose value is not a whole number of degrees the unclogging can be achieved.

It can be seen from the foregoing description that the arm can be rotated indifferently by the motor 17 or the manual control owing to the fact that the unidirectional drive mechanisms 19 and 36 are oriented in the same direction. Thus, when the motor 17 operates, the ratchet wheels $37^a$ and $37^b$ effect a relative movement of rotation in the direction of the escape or disengagement of the teeth 38. Inversely, if the motor 17 does not operate or is blocked, the arm can be driven in rotation by movements of 20° of the automatically-returned control lever 39, the extent of this movement being limited to this value by the stops 40 while the ratchet wheels 20$^a$, 20$^b$ effect a relative movement in the direction of the escape or disengagement of their teeth 21.

According to a modification, a motor may be provided, at the input end of the second step-by-step drive mechanism 36 instead of the manual actuating mechanism, to replace the motor 17 in the event of breakdown.

Thus it can be seen that the hydraulic motor 17 may be blocked or even disassembled without this preventing the filter from operating. It is then sufficient to unclog the filter either manually or by means of a motor coupled to the second drive mechanism. If the control is manual, the unclogging has no need to be continuous but it can be carried out twice a day, for example if it concerns a filter for hydrocarbons, without hindering the good operation of the filter. On the other hand, if the control is automatic, the motor 17 preferably operates permanently.

Having now described my invention what I claim as new and desire to secure by Letters Patent is:

1. An automatic counter-current cleaning filter comprising a housing having an axis, means defining a filtering chamber in said housing, a number of hollow filtering elements having inlets and outlets and arranged on a circle centered on said axis in the filtering chamber, the filtering chamber having a liquid inlet and a liquid outlet with which liquid inlet and liquid outlet the interiors of the filtering elements communicate in parallel, an impurity discharging chamber in which prevails a pressure lower than the pressure of the filtered liquid, and a hollow arm defining a passageway and mounted to rotate about said axis and capable of successively connecting as it rotates about said axis all the inlets of said elements to the impurity discharging chamber by way of said passageway, a first unidirectional step-by-step drive mechanism having a driven member, a second unidirectional step-by-step drive mechanism having a driven member, and means connecting the arm to be driven by the driven member of the first drive mechanism and means connecting the arm to be driven by the driven member of the second drive mechanism in the same direction as it is driven by the drive member of the first step-by-step drive mechanism.

2. A filter as claimed in claim 1, comprising means for manually controlling said second unidirectional step-by-step drive mechanism.

3. A filter as claimed in claim 2, wherein said second unidirectional step-by-step drive mechanism comprises a driving member and an actuating rod coupled with the driving member, the filter further comprises a control lever located outside the filter and rotatable between a first position and a second position, and means for automatically returning the control lever to said first position, the acuating rod being connected to so as to rotate with said lever.

4. A filter as claimed in claim 3, comprising a motor having an output member which is capable of undergoing a continuous to-and-fro movement, the first step-by-step drive mechanism having a driving member and means coupling the driving member of the first drive mechanism to the motor.

* * * * *